United States Patent
Neumann

(10) Patent No.: US 11,599,846 B2
(45) Date of Patent: Mar. 7, 2023

(54) METHOD AND SYSTEM FOR SELECTION OF A PATH FOR DELIVERIES

(71) Applicant: KPN INNOVATIONS, LLC., Lakewood, CO (US)

(72) Inventor: Kenneth Neumann, Lakewood, CO (US)

(73) Assignee: KPN INNOVATIONS, LLC., Lakewood, CO (US)

(*) Notice: Subject to any disclaimer, the term of this patent is extended or adjusted under 35 U.S.C. 154(b) by 0 days.

(21) Appl. No.: 16/919,573

(22) Filed: Jul. 2, 2020

(65) Prior Publication Data

US 2022/0004985 A1  Jan. 6, 2022

(51) Int. Cl.
| | | |
|---|---|---|
| *G06Q 10/08* | (2012.01) | |
| *G01C 21/36* | (2006.01) | |
| *G06Q 10/04* | (2012.01) | |
| *G01C 21/34* | (2006.01) | |
| *G06Q 10/0835* | (2023.01) | |
| *G06Q 10/0832* | (2023.01) | |

(Continued)

(52) U.S. Cl.
CPC ... *G06Q 10/08355* (2013.01); *G01C 21/3446* (2013.01); *G01C 21/3691* (2013.01); *G06N 20/00* (2019.01); *G06Q 10/047* (2013.01); *G06Q 10/0832* (2013.01)

(58) Field of Classification Search
CPC ......... G06Q 10/0832; G06Q 10/08355; G06Q 10/047; G06N 20/00; G01C 21/3691; G01C 21/3446; G09B 19/0092; G16H 20/60; G05B 2219/31277; G05B 2219/34112
See application file for complete search history.

(56) References Cited

U.S. PATENT DOCUMENTS

| | | |
|---|---|---|
| 9,639,908 B1 | 5/2017 | Reiss et al. |
| 9,898,788 B1 * | 2/2018 | Calargun ............... G06N 20/00 |

(Continued)

OTHER PUBLICATIONS

"Uber Eats Launches In-App Allergy Notifications Worldwide," by Sabrina Barr, Sep. 28, 2019 (Year: 2019).*

(Continued)

*Primary Examiner* — Omar Zeroual
*Assistant Examiner* — Brian Adams Heflin
(74) *Attorney, Agent, or Firm* — Caldwell Intellectual Property Law

(57) ABSTRACT

A method of path selection using vehicle route guidance is disclosed. The method receives a plurality of requests including a plurality of alimentary combinations and a plurality of destinations; computes a projected nutritionally guided order volume as a function of a first machine-learning process; determines a plurality of assembly times, the plurality of assembly times including an assembly time for each alimentary combination as a function of the nutritionally guided order volume; selects a runner route from a plurality of runner routes, for the delivering of at least one alimentary combination of the plurality of alimentary combinations as a function of the plurality of assembly times; generates a plurality of predicted routes as a function of a proximity of the plurality of destinations to the aggregation depot; and pairing with the courier, the predicted route that optimizes the objective function. A system of path selection is also disclosed.

18 Claims, 6 Drawing Sheets

(51) Int. Cl.
   *G06N 20/00*   (2019.01)
   *G06Q 10/047*  (2023.01)

(56) References Cited

U.S. PATENT DOCUMENTS

| | | | |
|---|---|---|---|
| 9,928,540 B1 | 3/2018 | Gerard et al. | |
| 10,133,995 B1* | 11/2018 | Reiss | G06Q 50/01 |
| 10,200,457 B2 | 2/2019 | Shariat | |
| 10,366,436 B1 | 7/2019 | Kumar | |
| 10,657,486 B1 | 5/2020 | Wolter et al. | |
| 2014/0324725 A1* | 10/2014 | Edmonds | G06Q 10/0835 |
| | | | 705/333 |
| 2014/0330738 A1* | 11/2014 | Falcone | G06Q 10/08355 |
| | | | 705/338 |
| 2015/0292894 A1* | 10/2015 | Goddard | G01C 21/3453 |
| | | | 701/400 |
| 2016/0189540 A1* | 6/2016 | Fowe | G08G 1/0129 |
| | | | 701/70 |
| 2017/0024789 A1* | 1/2017 | Frehn | G06Q 30/0621 |
| 2017/0228683 A1* | 8/2017 | Hu | G06F 16/29 |
| 2018/0107935 A1 | 4/2018 | Jeon | |
| 2019/0114583 A1* | 4/2019 | Ripert | G01C 21/34 |
| 2019/0130354 A1 | 5/2019 | Han et al. | |
| 2019/0164126 A1* | 5/2019 | Chopra | G06Q 10/08355 |
| 2019/0266557 A1 | 8/2019 | Berk et al. | |
| 2019/0295124 A1 | 9/2019 | Ramesh et al. | |
| 2019/0370915 A1* | 12/2019 | Garden | G06Q 10/06315 |
| 2019/0385121 A1 | 12/2019 | Waliany et al. | |
| 2020/0133268 A1* | 4/2020 | Walsh | B62D 15/0285 |
| 2020/0160268 A1* | 5/2020 | Han | G05D 1/0291 |
| 2020/0167722 A1* | 5/2020 | Goldberg | B64C 39/024 |
| 2021/0074403 A1* | 3/2021 | Neumann | G16H 50/20 |

OTHER PUBLICATIONS

"Uber Eats app adds allergy friendly filter, nixes single-use plastics," by Julie Littman, Sep. 27, 2019 (Year: 2019).*

"Uber Pet lets furry friends join the ride—for a fee/ It used to be that bringing a dog or cat in an Uber was unpredictable," by Andrew J. Hawkins, Oct. 9, 2019 (Year: 2019).*

"Uber Launches New Pet Feature so You Never Have to Leave Your Pooch at Home," The Latch, Jun. 25, 2020 (Year: 2020).*

* cited by examiner

METHOD AND SYSTEM FOR SELECTION OF A PATH FOR DELIVERIES

FIELD OF THE INVENTION

The present invention generally relates to the field of optimization. In particular, the present invention is directed to methods and systems for path selection using vehicle route guidance.

BACKGROUND

Efficient path selection using vehicle route guidance is an increasingly vital process for provisioning of alimentary combinations. However, existing methods for path selection using vehicle route guidance suffer from inaccuracy in predictions used to support further computations.

SUMMARY OF THE DISCLOSURE

In an aspect, a method of path selection using vehicle route guidance is disclosed. The method receives a plurality of requests including a plurality of alimentary combinations and a plurality of destinations. The method computes a projected nutritionally guided order volume as a function of a first machine-learning process, the machine-learning process trained by data correlating past nutritionally guided order volumes with a plurality of past extrinsic circumstances, wherein the machine-learning model receives at least a current extrinsic circumstances as inputs and outputs projected nutritionally guided order volume. The method determines a plurality of assembly times, the plurality of assembly times including an assembly time for each alimentary combination as a function of the nutritionally guided order volume. The method selects a runner route from a plurality of runner routes, for the delivering of at least one alimentary combination of the plurality of alimentary combinations as a function of the plurality of assembly times, wherein each runner route of the plurality of runner routes includes information related to a runner, an aggregation depot, and a path from an alimentary provider of the plurality of alimentary providers to the aggregation depot, The method generates a plurality of predicted routes as a function of a proximity of the plurality of destinations to the aggregation depot, wherein each predicted route of the plurality of predicted routes comprises a retrieval from the at least the aggregation depot, and at least a destination, of the plurality of destinations. The method pairs a predicted route of a plurality of predicted routes with a courier, wherein pairing further comprises generating an objective function based on a plurality of objectives; and pairing with the courier, the predicted route that optimizes the objective function.

In another aspect, a system for path selection using vehicle route guidance comprising a computer device is disclosed. The system comprises a computer device configured to receive a plurality of requests including a plurality of alimentary combinations and a plurality of destinations. Computing device computes a projected nutritionally guided order volume as a function of a first machine-learning process. Computing device computes a projected nutritionally guided order volume as a function of a first machine-learning process, the machine-learning process trained by data correlating past nutritionally guided order volumes with a plurality of past extrinsic circumstances, wherein the machine-learning model receives at least a current extrinsic circumstances as inputs and outputs projected nutritionally guided order volume. Computing device selects a runner route from a plurality of runner routes, for the delivering of at least one alimentary combination of the plurality of alimentary combinations as a function of the plurality of assembly times, wherein each runner route of the plurality of runner routes includes information related to a runner, an aggregation depot, and a path from an alimentary provider of the plurality of alimentary providers to the aggregation depot, Computing device generates a plurality of predicted routes as a function of a proximity of the plurality of destinations to the aggregation depot, wherein each predicted route of the plurality of predicted routes comprises a retrieval from the at least the aggregation depot, and at least a destination, of the plurality of destinations. Computing device pairs a predicted route of a plurality of predicted routes with a courier, wherein pairing further comprises generating an objective function based on a plurality of objectives; and pairing with the courier, the predicted route that optimizes the objective function.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for determining a selecting an optimal route for delivery of goods such as take-out food. A runner route may be selected for a runner to pick-up alimentary combinations from an alimentary provider and deliver it to an aggregation depot. Once in aggregation depot, a predicted route may be selected for a courier to deliver the alimentary combinations to the users. Runner route and predicted route may be selected as a function of current traffic conditions, current weather, the proximity of the runner to the alimentary provider, and the proximity of the courier to the aggregation depot. Exemplary embodiments illustrating aspects of the present disclosure are described below in the context of several specific examples.

Figure 1:
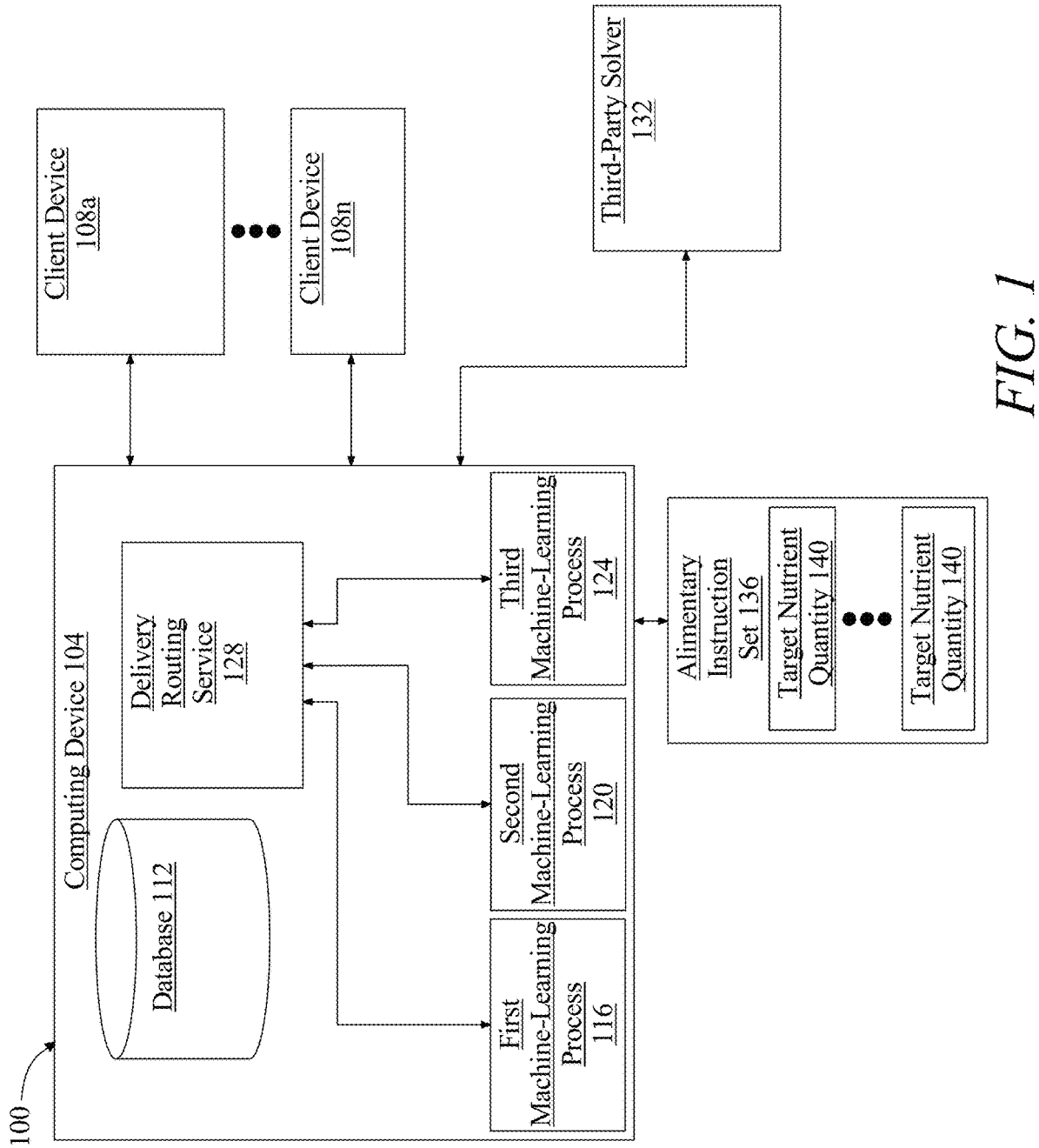
FIG. 1 is a block diagram illustrating an exemplary embodiment of a system for path selection using vehicle route guidance.

Referring now to FIG. 1, an exemplary embodiment of a system 100 for path selection using vehicle route guidance is illustrated. System includes a computing device 104. Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device.

Computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, computing device 104 may communicate with a plurality of client devices 108 corresponding to users, alimentary providers, and/or couriers. Each client device of plurality of client devices 108 may be implemented in any manner suitable for implementation of computing device 104. As used in this disclosure, "alimentary providers" may include any entities that prepare alimentary combinations. As a non-limiting example, alimentary providers may prepare alimentary combinations at a restaurant. Other such alimentary providers may include any combination of one or more of the following: restaurants, bars, cafes, or other vendor of food or beverages, such as a hotel. System 100 may also communicate with devices operated by one or more couriers; such devices may be implemented in any manner suitable for implementation of computing device 104. A "courier," as defined in this disclosure, is a person and/or device that transports alimentary combinations to one or more users requesting alimentary combinations. Such couriers may be on foot, or traveling by vehicle, such as a car, scooter, bicycle, etc. One or more couriers may be directed to one or more aggregation depots to receive an order placed by users and deliver the orders to the users located at corresponding destinations, which may include without limitation residential or commercial addresses. In some embodiments, the destinations may correspond to a particular geo-location determined by GPS or other coordinate system.

With continued reference to FIG. 1, computing device 104 may further connect to and/or include a database 112. Database 112 may be implemented, without limitation, as a relational database 112, a key-value retrieval database 112 such as a NOSQL database 112, or any other format or structure for use as a database 112 that a person skilled in the art would recognize as suitable upon review of the entirety of this disclosure. Database 112 may alternatively or additionally be implemented using a distributed data storage protocol and/or data structure, such as a distributed hash table or the like. Database 112 may include a plurality of data entries and/or records as described above. Data entries in a database 112 may be flagged with or linked to one or more additional elements of information, which may be reflected in data entry cells and/or in linked tables such as tables related by one or more indices in a relational database 112. Persons skilled in the art, upon reviewing the entirety of this disclosure, will be aware of various ways in which data entries in a database 112 may store, retrieve, organize, and/or reflect data and/or records as used herein, as well as categories and/or populations of data consistently with this disclosure. In some embodiments, network data, or other information such as user information, courier information, and alimentary provider information, may be stored in and/or retrieved from database 112.

Figure 2:
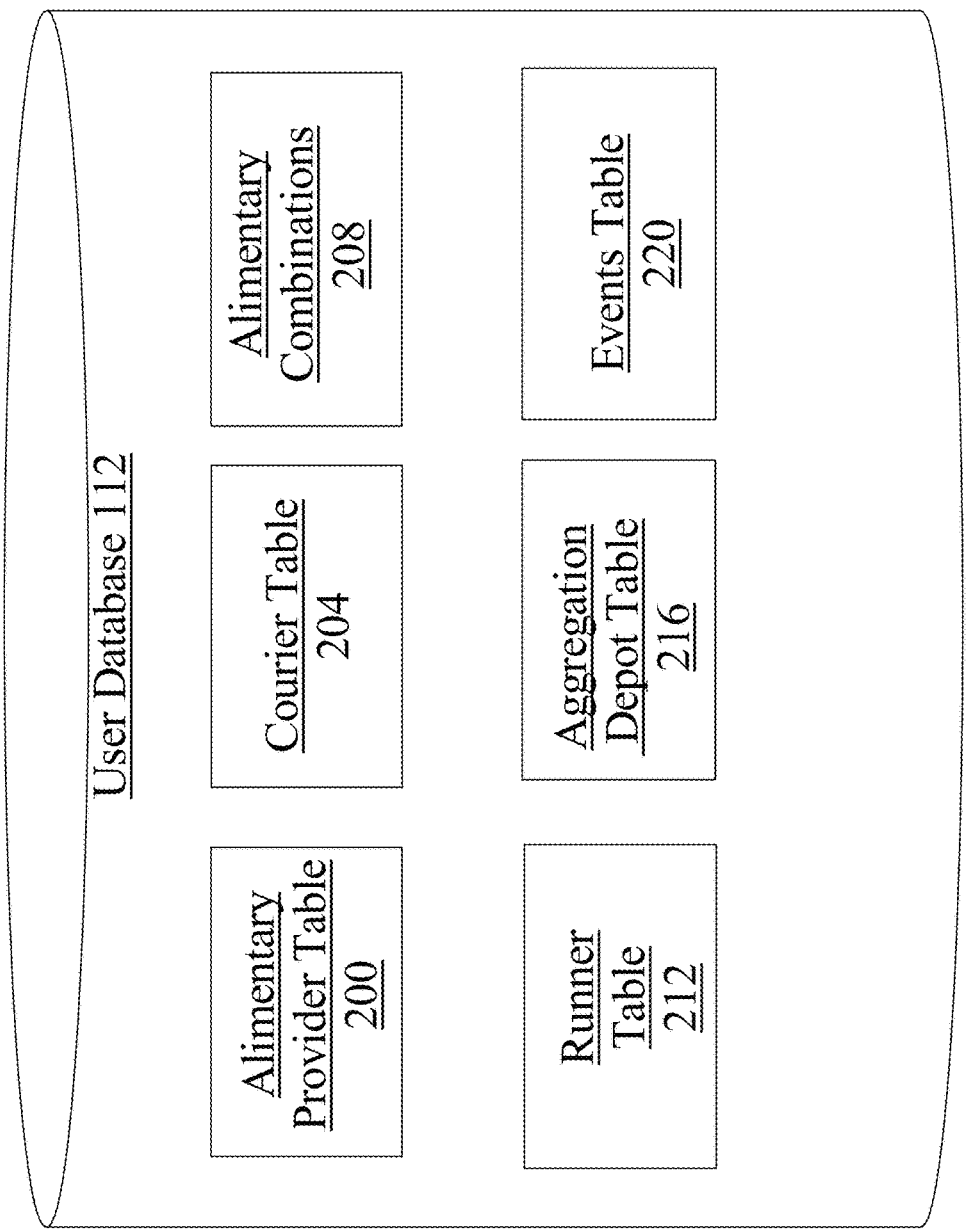
FIG. 2 is a block diagram illustrating an exemplary embodiment of a database according to an embodiment of the invention.

Referring now to FIG. 2, an exemplary embodiment of a database 112 is illustrated. Database 112 may, as a non-limiting example, organize data stored in the database according to one or more database tables. One or more database tables may be linked to one another by, for instance, common column values. For instance, a common column between two tables of database 112 may include an identifier of a user, such as a alimentary provider and alimentary combination, or the like, for instance as defined below; as a result, a query may be able to retrieve all rows from any table pertaining to a given user order or previous order. Other columns may include any other category usable for organization or subdivision of data, including types of data, common pathways between, for example, a runner and an alimentary provider or a courier to an aggregation depot, times of order submission, or the like; persons skilled in the art, upon reviewing the entirety of this disclosure, will be aware of various ways in which expert data from one or more tables may be linked and/or related to expert data in one or more other tables.

Still referring to FIG. 2, one or more database tables in database 112 may include, as a non-limiting example, an alimentary provider table 200, which may be used to store information about alimentary provider. This may include, but not limited to, the provider's contact information, website address, menu of alimentary combinations, peak times for the alimentary provider, slack times for the alimentary provider, or the like. As another non-limiting example, one or more tables in database 112 may include a courier table 204 which may be used to store information about a courier, such as but not limited to, name of courier, method of transportation (for example a motor vehicle, motorcycle, on foot), average distance courier travels from aggregation depot to destinations, or the like. As another non-limiting example, one or more tables in database 112 may include an alimentary combination table 208. An alimentary combination table 208 may include, but not limited to potential combinations available at an alimentary provider, the degree of perishability of a combination, the cost of preparation of the combination, the cost to the user, the margin cost, the frequency the combination is ordered by a user, or the like. As another non-limiting example, one or more tables in database 112 may include a runner table 212. A runner table 212 may include information about a runner such as, but not limited to, the name of the runner, method of transportation (for example, a motor vehicle, a bicycle, a motorcycle, or on foot), average distance a runner travels from an alimentary provider to the aggregation depot, or the like. As another non-limiting example, one or more tables in database 112 may include an aggregation depot table 216. An aggregation depot table 216 may include, but not limited to, the contact information for the aggregation depot, a website address, number of order processed, peak times for the depot, slack times for the depot, or the like. As another non-limiting example, one or more tables in database 112 may include an event table 220. An event table 220 may contain events related to the lifecycle of an alimentary combination from the moment the combination is ordered by the user to the moment it is delivered. For example, events may include "order received," order picked-up," "order delivered," or the like. Events will be discussed further below.

Referring back to FIG. 1, users interacting with the client devices 108 may communicate with system 100 to request, search for, and/or browse for alimentary combinations. An "alimentary combination," is defined for the purposes of this disclosure as a combination of ingredients that an alimentary provider and/or alimentary provider device indicates may be provided, for instance and without limitation in the form of a meal. Various users, alimentary providers, and couriers may transmit information related to one or more orders to computing device 104 via corresponding client devices 108. As previously described, such information may include order information, payment information, activity updates, timestamps, location information, or other appropriate electronic information. System may utilize this transmitted information to batch orders and assign optimal routes to couriers for pickup and delivery of order for perishable goods. In another example, a software application executed on a mobile device, with proper permissions, may use a navigational facility global positioning system (GPS) capabilities to determine the user's location and automatically update the network with a user's location, whether in numerical terms such as latitude and longitude coordinates, and/or in relative or user-related terms such as "at home," "at work," in a particular municipality, or any other characterization of a geographical location and/or area.

With continued reference to FIG. 1, computing device may be configured to implement a first machine-learning process 116 for computation of nutritionally guided order volumes as described in further detail below. A second machine-learning process 120 may be used to determine a guidance-free order volume as described in further detail below. A third machine-learning process 124 may be implemented on computing device 104 to determine assembly times as set forth in further detail below. An "assembly time," as used in this disclosure, is an amount of time that it takes an alimentary provider to prepare an alimentary combination, such that the alimentary combination is ready for delivery. Computing device 104 may be configured to include a delivery routing system 128 to select a runner route for a runner that may take, for example, an alimentary combination from an alimentary provider to an aggregation depot, and/or to perform pairing algorithm to offer couriers a plurality of predicted routes between the aggregation depot to a plurality of destinations. As defined in this disclosure, a runner is any human subject, autonomous vehicle, unmanned aerial vehicle, or the like that may be able to transport alimentary combinations from an alimentary provider to an aggregation depot or directly to a consumer. A runner may be on foot, or traveling in an automobile, a bicycle, a scooter, or the like. As defined in this disclosure, a runner route is any path or route that any runner may take to get from the alimentary provider to the aggregation depot or directly to the consumer. In some embodiments, the delivery routing system 128 may optimize parings of routes with couriers; alternatively, or additionally, a third-party solver 132 may perform some optimization calculations. Computing device 104 may receive and/or generate an alimentary instruction set 136 as described in further detail below; alimentary instruction set may include a plurality of target nutrient quantities 140.

Figure 3:
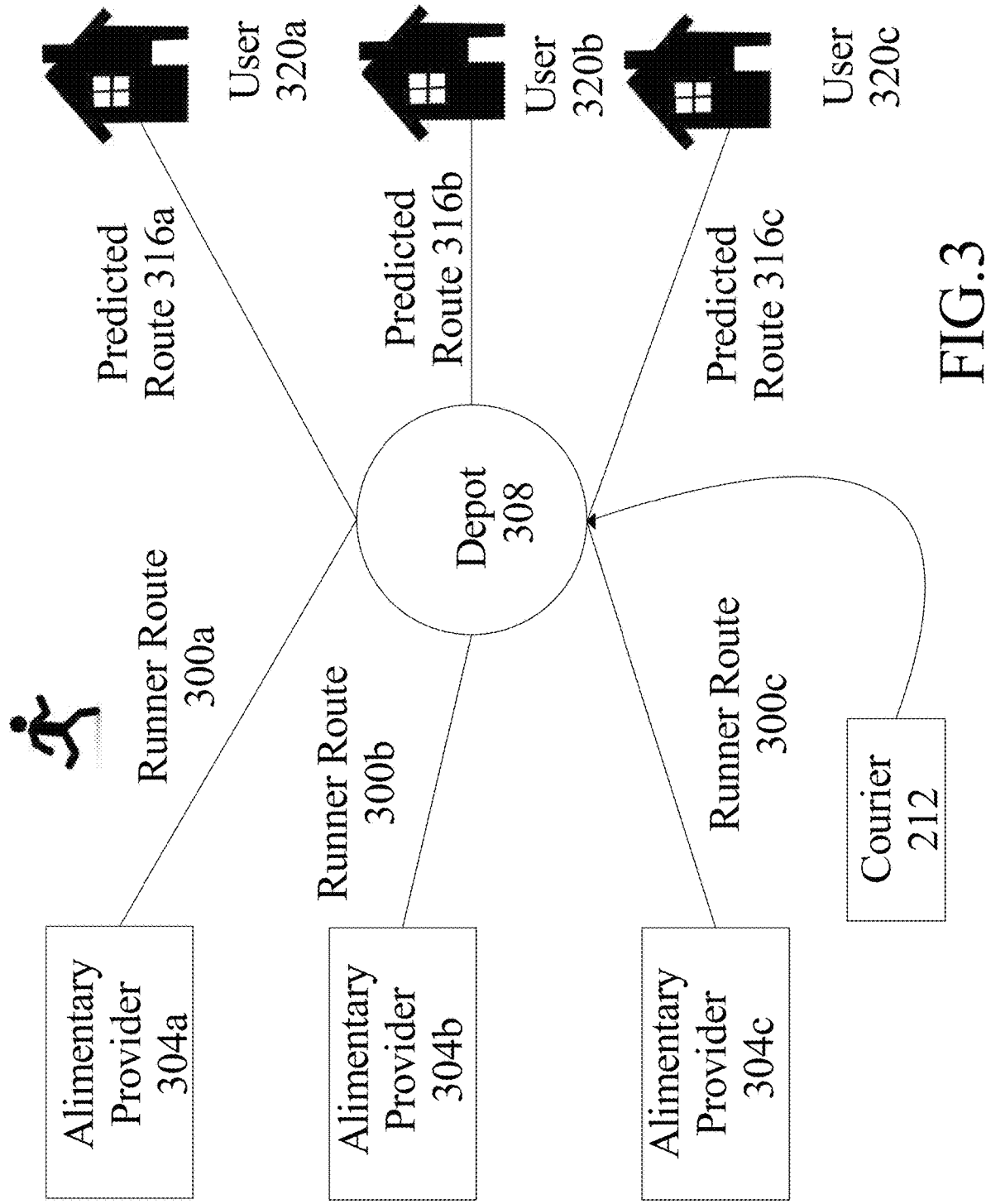
FIG. 3 is a block diagram of an exemplary embodiment of a path selection system illustrating a workflow that may be used with such a system according to an embodiment of the invention.

Referring now to FIG. 3, computing device 104 may implement methods as described in further detail below to compute, select, and/or pair a plurality of runner route 300*a-c* from an alimentary provider 304*a-c* that a runner, who may be selected without limitation from a plurality of runners, may utilize to deliver alimentary combinations to an aggregation depot 308. A courier 312, who may be selected from a plurality of couriers, may deliver the alimentary combination to users 320*a-c* by using a predicted route 316*a-c* to a user 320*a-c*. As used in this disclosure, a "predicted route" is a selected route based on parameters for a courier to deliver an alimentary combination. For instance, a user 316a-c may order food from an alimentary provider 304a-c by using a mobile device application that places the order through system. In some instances, user may also access system through the Internet via a user client device of client devices 108a-n, which may include without limitation computer, laptop, tablet, or the like. When user orders alimentary combinations through system, a resulting order may prepared at an alimentary provider 304a-c site, where a runner may then pick up the order and deliver the order from the alimentary provider site 304a-c to an aggregation depot 308. As used in this disclosure, an "aggregation depot" is defined as a centralized drop-off location of, for example, alimentary combinations, where the different alimentary combinations may be aggregated so they may be delivered to a plurality of users 316a-c. A courier 312 may deliver a plurality of orders from one or more alimentary providers 304a-c to one or more users using a predicted route 312a-c.

Still referring to FIG. 3, delivery events associated with delivery of alimentary combinations may fall on a timeline. A timeline may include various events that occur when an order is placed by a user, on an alimentary provider timeline, a runner timeline, and a courier timeline. An alimentary provider 204a-c timeline, the runner timeline or courier 312 timeline may include additional or fewer events than described here. Events in a timeline may be tracked via transmission between a server system and a client device 108 associated with one or more runners, couriers 312, alimentary providers 304a-c, and/or users 320a-c, for instance as described above. As used herein, client devices 108 associated with users may be referred to as "user devices," client devices 108 associated alimentary providers may be referred to as "alimentary provider devices," client devices 108 associated with runners may be referred to as "runner devices," and client devices 108 associated with couriers may be referred to as "courier devices."

Still referring to FIG. 3, events that occur on an alimentary provider 304a-c timeline may include order creation, order placement, order confirmation, order ready, and order pickup. An order creation may occur when system 100 receives an order created by a user 320a-c. Order may be received at the server system. Order may then be routed to a designated alimentary provider 304a-c. In some embodiments, order is routed to designated alimentary provider 304a-c by transmitting information corresponding to the order from the server to an alimentary provider device. An order placement event may occur when an order is received at an alimentary provider device. In some embodiments, alimentary provider may acknowledge receipt of an order by transmitting a confirmation, which may trigger an order confirmation event. Order confirmation may signal that preparation of an order has begun by an alimentary provider 304a-c. In some embodiments, a period of time between order creation and order confirmation may be referred to as a kitchen latency. An order ready event may subsequently occur when preparation of alimentary combinations in an order is completed and the order is ready for pickup by a runner. Event may be triggered by an alimentary provider 304a-c confirmation that order is ready. Such confirmation may be transmitted by alimentary provider device to computing device 104.

Further referring to FIG. 3, alimentary provider 304a-c may then wait for a runner to arrive for retrieval of order. When a runner arrives and picks up order, an order pickup event may occur; this event may also be triggered by an alimentary provider 304a-c confirmation that a runner has received order. Once the runner delivers the order to the aggregation depot 308, an order receipt event may be triggered at the aggregation depot 308. When a courier arrives and picks up order at an aggregation depot 304, an order pickup event may occur; this event may also be triggered by an aggregation depot 308 that a courier has received the order. In some embodiments, events that occur on a runner timeline may overlap or correspond with one or more events on an alimentary provider 304a-c timeline. In some embodiments, events that occur on a courier 312 timeline may overlap or correspond with one or more events on an aggregation depot 308 timeline. Events on runner timeline may include order assignment, parked at alimentary provider, arrival at alimentary provider, order pickup, return to vehicle, parked at aggregation depot, and/or order delivered to aggregation depot. Events on courier 312 timeline may include order creation, order assignment, parked at aggregation depot, arrival at aggregation depot, order pickup, return to vehicle, parked at user, and/or order delivered.

In some embodiments, order assignment may be triggered by confirmation of acceptance of the order by a runner, for instance after a runner route 300a-c has been paired with an alimentary provider 304a-c as described in further detail below. System may transmit a notification to a runner device corresponding to runner. In some embodiments, a period of time between order creation and order assignment may be known as assignment latency. When order assignment occurs may depend on various factors, including a distance of runner from alimentary provider 304a-c, a travel time of the runner to the alimentary provider 304a-c, traffic, time of day, or the like. In some embodiments, order assignment may not occur until the order has been confirmed by alimentary provider 304a-c or is being prepared by the alimentary provider 304a-c. In some embodiments, order assignment may not occur until alimentary provider has confirmed that order is ready for retrieval.

In some embodiments, order assignment may be triggered by confirmation of acceptance of the order by a courier 312, for instance after a predicted route 316 a-c has been paired with a courier 312 as described in further detail below. System may transmit a notification to a courier device corresponding to courier 312. In some embodiments, a period of time between order arrival at aggregation depot and order assignment may be known as assignment latency. When order assignment occurs may depend on various factors, including a arrival time of the runner at aggregation depot 308, distance of courier 312 from user 320a-c, a travel time of courier 312 to the user 320a-c, traffic, time of day, or the like. In some embodiments, order assignment may not occur until the order has arrived at the aggregation depot 308.

Still referring to FIG. 3, once an order is assigned to a runner, the runner may travel to alimentary provider 304a-c location to pick up the order. Runner may then pick up order upon arrival at alimentary provider 304a-c location, and trigger order pickup. In some embodiments, the system may perform one or more processes and/or process steps as described in further detail below to assign orders and a runner route 300a-c such that the arrival at alimentary provider 304a-c coincides with the event "order ready." This may optimize the actions of the courier 312 and the alimentary provider 304a-c to minimize down time, which may occur where runner arrives before the alimentary provider 304a-c has completed the order, or where the alimentary provider 304a-c has completed the order before the courier arrives.

Still referring to FIG. 3, once an order is assigned courier 312 may travel to aggregation depot 308 location to pick up the order. Courier 312 may then pick up order upon arrival at aggregation depot 308 location, and trigger order pickup. In some embodiments, system 100 may perform one or more processes and/or process steps as described in further detail below to assign orders and a predicted route 316a-c to a courier 312 or a plurality of couriers such that arrival at aggregation depot 308 coincides with order ready for pickup. This may optimize the actions of courier 312 and aggregation depot 308v to minimize down time, which may occur where courier 312 arrives before the order arrives at the aggregation depot 308.

In some embodiments, and with further reference to FIG. 3, additional events may be tracked between order assignment and arrival at alimentary provider 304a-c. For example, a runner may travel to an alimentary provider 304a-c location by vehicle and then park her vehicle in an appropriate location to reach the alimentary provider 304a-c. In some embodiments, runner may confirm that vehicle is parked by transmitting a confirmation from the runner device to the server, thereby triggering parked at alimentary provider event. Runner may then have to walk or otherwise travel from parking location to alimentary provider 304a-c. An arrival at alimentary provider event may also occur when runner has arrived at alimentary provider location. A confirmation of a courier 312's arrival may be sent by runner device and/or alimentary provider device. In various embodiments, tracking these additional events may provide more accuracy of predictions and/or route assignments as described in further detail below. In some embodiments, runner may have to wait for order to be completed. After order retrieval, runner may then travel to aggregation depot 308 location to deliver the order. Order delivery may occur when the order has arrived at the aggregation depot. Order delivery may be triggered by confirmation of the delivery at the aggregation depot 308 by the runner via corresponding devices.

In some embodiments, and with further reference to FIG. 3, additional events may be tracked between order delivery at user 320a-c and arrival at aggregation depot 308. For example, a courier 312 may travel to an aggregation depot 308 location by vehicle and then park her vehicle in an appropriate location to reach the aggregation depot 308. In some embodiments, courier 312 may confirm that vehicle is parked by transmitting a confirmation from courier device to computing device 104, thereby triggering parked at aggregation depot event. Courier 312 may then have to walk or otherwise travel from parking location to aggregation depot 308. An arrival at aggregation depot event may also occur when courier 312 has arrived at aggregation depot 308. A confirmation of courier's 312 arrival may be sent by courier device. In various embodiments, tracking these additional events may provide more accuracy of predictions and/or predicted route 316a-c assignments as described in further detail below. In some embodiments, courier 312 may have to wait for order to be delivered by the runner to the aggregation depot 308. After order retrieval from the aggregation depot 308, courier 312 may then travel to user 320a-c location to complete delivery of the order at order delivery. Order delivery may occur when the order has been given to the user 320a-c. Order delivery may be triggered by confirmation of the delivery by the user 320a-c or the courier 312 via corresponding devices.

In some embodiments, and still referring to FIG. 3, a predicted estimated time of completion may be generated for each event on timelines. In some embodiments, predicted estimated times of completion for one or more events may be transmitted to various client devices 108, such as user devices, alimentary provider devices, runner devices, and courier devices. Predicted estimated times of completion may further be used for delivery routing system 128 for assignment of orders to runners and alimentary providers 304a-c for delivery to aggregation depot 308 and assignments of predicted routes 316a-c for a courier 312 to deliver the alimentary combination from aggregation depot 308 to user 320a-c. In an embodiment, use of timelines as described above divides a delivery process into distinct delivery events that are more predictable because they depend on unique features of an alimentary provider 304a-c, and/or a runner, and/or courier 312, such as order protocol, food preparation speed, driving speed, or the like.

Figure 4:
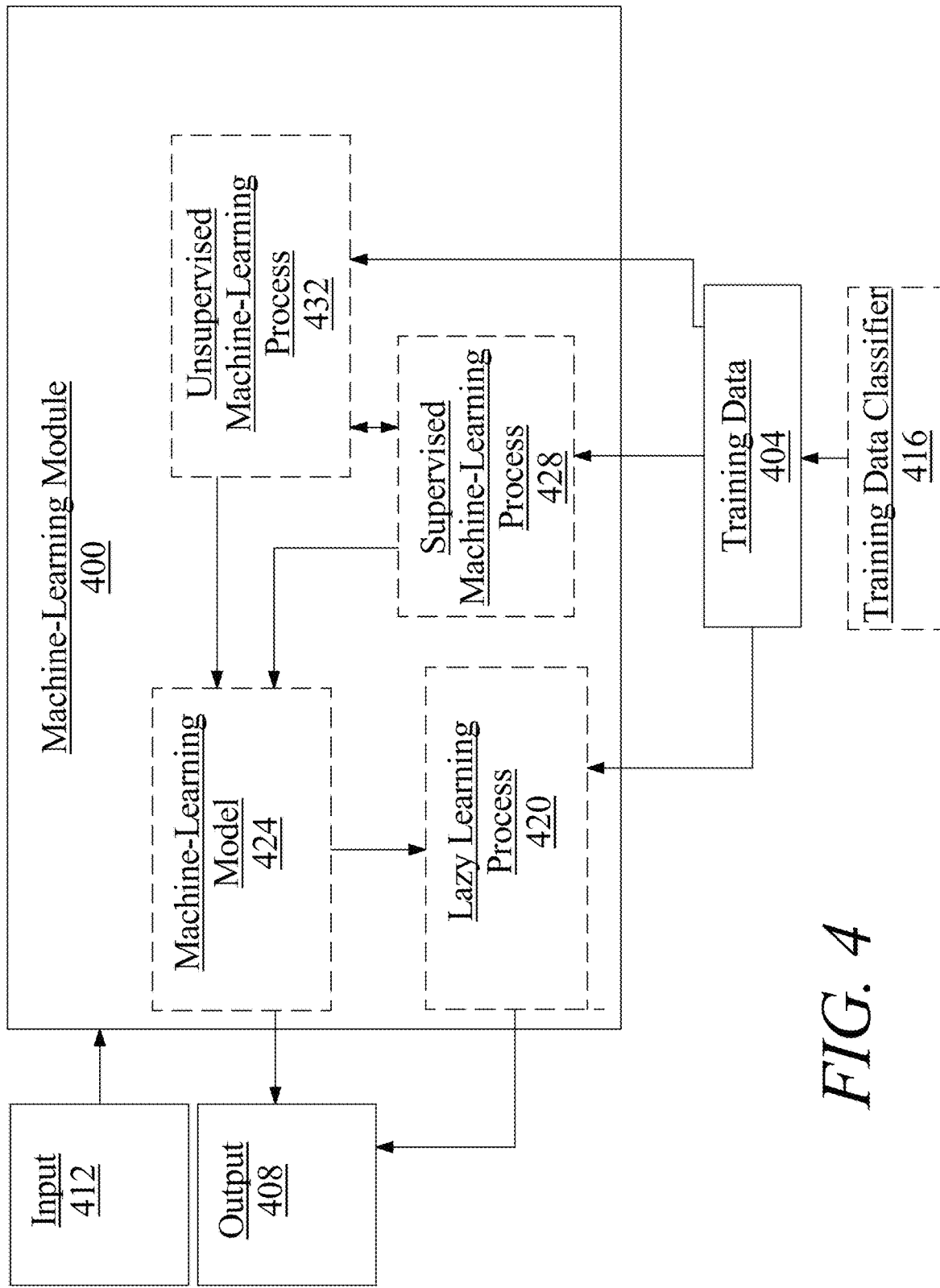
FIG. 4 is a block diagram of an exemplary embodiment of a machine-learning process according to an embodiment of the invention.

Referring now to FIG. 4, an exemplary embodiment of a machine-learning module 400 that may perform one or more machine-learning processes as described in this disclosure is illustrated. Machine-learning module may include any suitable Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example, training data used for first machine-learning process 116 may include a plurality of entries correlating extrinsic data, as described above, to past volumes of nutritionally guided orders; each element of past data may be archived and/or tracked on computing device 104 and/or other elements of system 100, with correlations according to timestamps of such recorded data. Computing device 104 may train first machine-learning process 116 and/or use first machine-learning process 116 using training data.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 400 may generate a classifier using a classification algorithm, defined as a process whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sort, for example, a runner into categories where delivery of certain alimentary combinations may not be desired or appropriate for a particular runner. A runner, for example, may be allergic to gluten, and may not want to be exposed to products containing gluten. The particular runner may be classified as "delivery of gluten free items only," or the like. For health and/or religious reasons, a runner may be classified as able to deliver only vegetarian alimentary combinations. Training data used in one or more machine-learning processes as described below may alternatively or additionally be classified by geographic location and/or area, by climatic region, local language, season or other cyclic weather pattern, or the like.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 4, machine-learning processes as described in this disclosure may be used to generate machine-learning model 424. A "machine-learning model 424," as used in this disclosure, is a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include traffic conditions at specific times, for a runner or a courier as described above as inputs, while providing a list of potential routes as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Still referring to FIG. 4, models may be generated using alternative or additional artificial intelligence methods, including without limitation by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. This network may be trained using training data 404.

Still referring to FIG. 4, inputs may include one or more projected guidance-free order volume. A "guidance-free order volume," as used in this disclosure, is a volume and/or number of orders that are not prepared according to an alimentary instruction set used within system 100. As a non-limiting example, an order making up part of guidance-free order volume may be an order by a person or a party of persons that decide to order a meal or a plurality of meals for a party, conference, special occasion, or the like, without regard to any kind of meal plan or instruction set as described above. Such guidance-free orders may be generated and/or received through a variety of services and platforms, some of which may be inside of system 100 while others be outside of system 100; thus guidance-free order volume may be measured and/or recorded less directly than nutritionally guided order volume.

In an embodiment, and still referring to FIG. 4, determining a plurality of assembly times may include computing a projected guidance-free order volume and determining the plurality of assembly times as a function of the projected nutritionally guided order volume and the projected guidance-free order volume. Computing guidance-free order volume may include training a second machine-learning process 120 using training data associating past guidance-free order volumes with a plurality of past extrinsic circumstances, which may include any extrinsic circumstances as described above, receiving at least a current extrinsic circumstance, and computing projected guidance-free order volume as a function of the at least a current extrinsic circumstance using the machine-learning process. second machine-learning process 120 may include any machine-learning process as described above, including without limitation a regression-based machine-learning process, a process implementing and/or training a neural net, or the like.

Further referring to FIG. 4, training data may include a plurality of entries correlating past extrinsic data to guidance-free order volumes. As a non-limiting example, certain dates may fall on holidays that are historically known to be busy days. Thus, certain holidays may be correlated with increased number of orders placed in general. Additionally, certain times of the day may be associated with greater volumes of orders. In some embodiments, a size of markets may correspond to the number of individuals in a certain market who are potential users, couriers, and/or alimentary providers of a product or service. As used herein, the term market may be used to mean either a particular alimentary provider, or a group of alimentary providers associated with a particular product type. However, in some embodiments, the term market may refer to the total users, couriers, and/or alimentary providers in a given area that is part of the on-demand delivery service. second machine-learning process 120 may identify particular market sizes as correlated with certain differences in times for order preparation. A size of markets may also correspond to new and more mature markets. For example, a newer market may be correlated with longer order preparation times in third machine-learning process 124, while more mature markets may be correlated with faster order preparation times. Computing device 104 may calculate a projected guidance-free order volume as a per-provider guidance-free order volume, which may project guidance-free order for each alimentary provider. In an embodiment, projected guidance-free order volume may be used to determine a likely current or near-future order volume in which a significant portion of orders originate from entities and/or devices outside of system 100. In some embodiments, entities not affiliated with system 100 or an operator thereof may not provide up-to-date order information to system 100; using machine learning to compute a projected guidance-free order volume using historical data, for instance as reported by and/or collected from alimentary providers, may enable system 100 to track overall demand, as well as demand driven by nutritionally guided orders in system 100, and thus more accurately determine assembly times, capacity of alimentary providers to fulfill needed orders, and/or a number of couriers needed within a given region.

Figure 5:
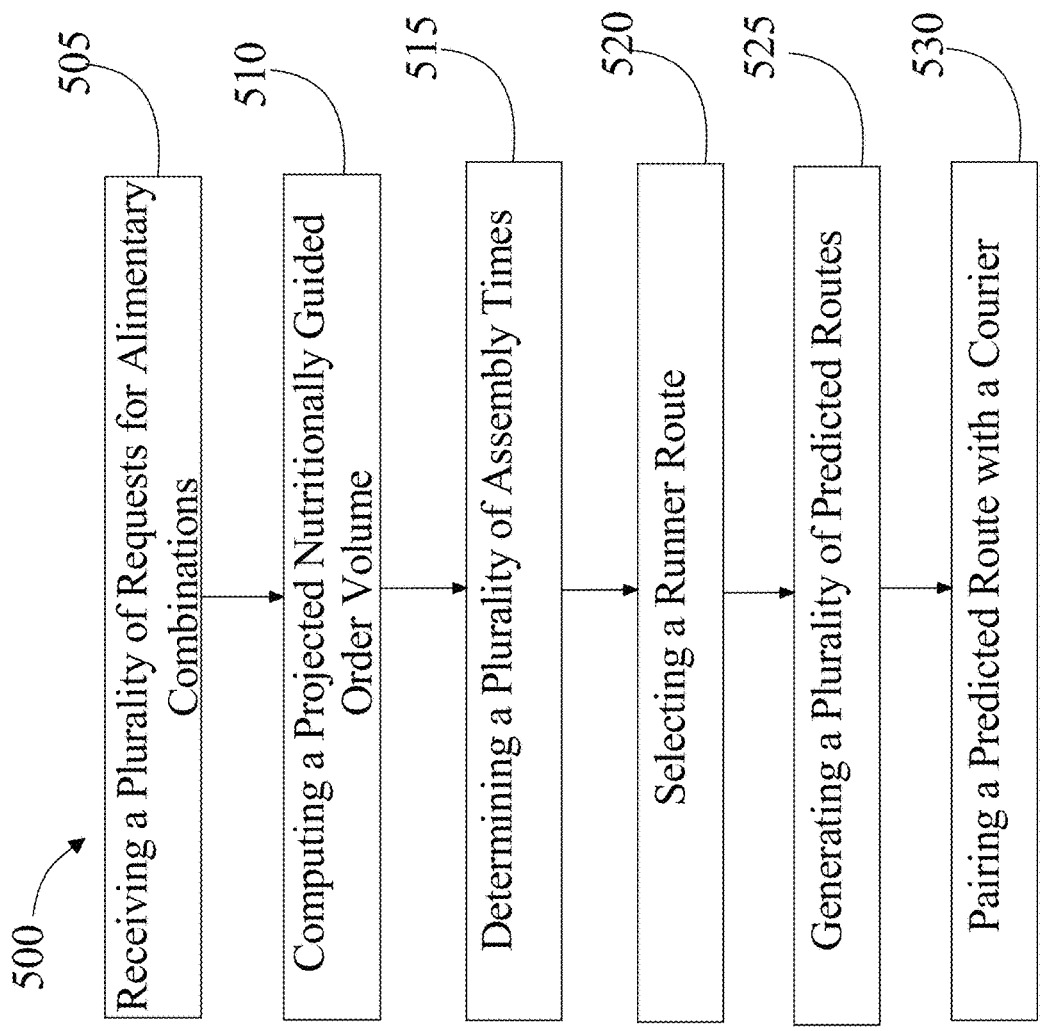
FIG. 5 is a flow diagram illustrating an exemplary embodiment of a method of path selection.

Referring now to FIG. 5, an exemplary embodiment of method 500 method of path selection using vehicle route guidance is illustrated. At step 505, a computing device receives a plurality of requests including a plurality of alimentary combinations and a plurality of destinations. Each request specifies an alimentary combination of the plurality of alimentary combinations to be assembled by an alimentary provider of a plurality of alimentary providers. Each request of plurality of requests includes a destination or plurality of destinations. An order may be placed by a user on a corresponding user device as described above. Order may be placed in a web browser or an application installed on user device. Order information may be transmitted via network. Destination may include location information corresponding to a location for delivery of order. For example, a location of the user device may be determined via GPS and/or other navigational facilities. As another example, location information may include an address corresponding to user. Order placement may further include additional information, such as ordered items, payment information, and other user information. In some embodiments, receipt of an order may correspond to an order creation event as described above.

In some embodiments, and still referring to FIG. 5, updates to order may be received by computing device 104. In some embodiments, order updates may include addition or removal of various items in an order, cancellation of the order, changes in delivery location, or the like. In some embodiments, updates to order may be factored into a predicted time of order delivery. In some embodiments, a confirmation of delivery may be received from user device. For example, user may transmit a confirmation of delivery via user device once order is received from a courier. Alternatively, or additionally, confirmation of delivery may be transmitted by a courier via a corresponding courier device.

Still referring to FIG. 5, at step 510, computing device 104 computes a projected nutritionally guided order volume. A "nutritionally guided order volume," as used in this disclosure, is a number of orders received in a given period of time in that are generated pursuant to an alimentary instruction set, which may include one or more recommended nutritional quantities. Generation and use of alimentary instruction sets may be performed by computing device 104 and/or another element of system 100, for instance and without limitation as described in U.S. Non-provisional application Ser. No. 16/502,835, filed on Jul. 3, 2019, and entitled "METHODS AND SYSTEMS FOR ACHIEVING VIBRANT CONSTITUTION BASED ON USER INPUTS," the entirety of which is incorporated herein by reference.

Still referring to FIG. 5, computing device 104 may compute projected nutritionally guided order volume using one or more scheduled nutritionally guided orders generated through computing device 104 and/or system 100 as described above; for instance, some number of users in a geographic region may have received alimentary instruction sets, for instance as described above, and/or may have scheduled one or more alimentary combinations to be prepared and/or consumed based on alimentary combinations, on a given date and/or at a given time.

In an embodiment, and still referring to FIG. 5, computing device 104 may compute projected nutritionally guided order volume which may include as a function a first machine-learning process 116. The first machine-learning process may include using training data correlating past nutritionally guided order volumes with a plurality of past extrinsic circumstances, and receiving at least a current extrinsic circumstances, and computing the projected nutritionally guided order volume as a function of the at least a current extrinsic circumstance using the machine-learning process. An "extrinsic circumstance," as used herein, is any parameter that may be used to predict nutritionally guided order, including without limitation a calendar date, time of day, season, one or more scheduled and/or spontaneous events such as sporting events, concerts, protests, conventions, or the like, current and/or forecasted weather, current and/or forecasted traffic, a volume of nutritionally guided orders that have already been received, a volume of guidance-free orders, as defined below, that have already been received, and/or a projected guidance-free volume as described in further detail below.

Continuing to refer to FIG. 5, computing projected nutritionally guided order volume may include computing a per-provider nutritionally guided order volume. As used herein, a "per-provider nutritionally guided order volume" is a prediction for a volume of nutritionally guided orders that will be received by a particular provider. For instance, and without limitation, a separate regression algorithm and/or neural net may be trained and/or utilized to compute a per-provider nutritionally guided order volume for each alimentary provider. Neural network may include a plurality of subnetworks, each of which function as a predictive event model to generate a nutritionally guided order volume for a particular alimentary provider. In an embodiment, per-provider nutritionally guided order volumes may be aggregated using averaging, addition, or the like, to produce an overall and/or aggregate nutritionally guided order volume over a geographical region, which may include any geographical region as described in further detail below.

Still referring to FIG. 5, at step 515, computing device 104 determines a plurality of assembly times. At step 515, and still referring to FIG. 5, computing device 104 determines a plurality of assembly times. In an embodiment, a plurality of assembly times includes an assembly time for each alimentary combination of plurality of alimentary combinations. Computing device 104 determines each assembly time of plurality of assembly times as a function of the nutritionally guided order volume. Nutritionally guided order volume may affect assembly time in various ways; for instance, an alimentary provider may have particular persons ingredients, and/or pieces of equipment that can process only a limited number of orders at a time, such that a nutritionally guided order volume above a certain volume may cause increasing delays in assembly of alimentary combinations.

Still referring to FIG. 5, computing device 104 may determine each assembly time of plurality of assembly times by performing third machine-learning process 124. Third machine-learning process may be implemented using any machine-learning algorithm as described above, including without limitation performance of a regression algorithm, training a neural net, or the like. Computing device 104 may train third machine-learning process 124 using training data correlating inputs including past nutritionally guided order volumes to outputs representing past assembly times, where past assembly times, training data, and/or one or more models produced may be specific to alimentary provider. For instance, and without limitation some alimentary providers may be more likely to have increased assembly times as a result of grater nutritionally guided order volumes than others owing to factors such as limited staffing, facility sizes, equipment, prepared ingredient supplies, and the like. Computing device 104 may input projected nutritionally guided order volume, which may be combined with one or more additional inputs, to third machine-learning process 124, and output an assembly time for each alimentary provider of plurality of alimentary providers.

With continued reference to FIG. 5, inputs to third machine-learning process 124 may further include types of alimentary combinations. For example, certain dishes may be correlated with particular assembly times. Inputs may include order sizes; in some embodiments, more items within an order may correlate to longer assembly times. Inputs may include order prices. For instance, a sub-total price of an order may also correspond to order size or order preparation time and may be used as a proxy to order size; a larger sub-total may correlate to a larger number of items within the order. Additionally, more expensive items may take longer to make, due to more ingredients, more difficulty, or more specialization in preparation. Inputs may include one or more particular nutritional recommendations followed in preparing alimentary combinations; for instance, some nutritional recommendations may be more labor intensive, be more complex, or require ingredients that take longer to prepare such as ingredients that must be soaked, marinated, fermented, cooked slowly, or the like. Some processes for generating recommended meals may be more demand-sensitive, as they might require more skilled preparation or preparation by a limited number of persons and/or specialized equipment. Similarly, in some embodiments, a neural network and/or regression model used in third machine-learning process 124 may determine an average rate for time durations between one or more events on an alimentary provider timeline for a particular alimentary provider, for instance as described above. However, historical performance may also be input as parameters. Historical performance of a particular alimentary provider may also be input. This may include an average time duration between events on alimentary provider timeline for that particular alimentary provider. Neural network and/or regression model may use this factor to assign a particular state variable to a given alimentary provider to adjust predictions accordingly. For example, an average time for a particular alimentary provider to prepare a particular item may be tracked and determined. As an example, some alimentary providers may not transmit a confirmation of receipt of order, but instead immediately begin preparation of the order. Once an order has been complete, alimentary provider may then transmit a confirmation of receipt of order and confirmation of completion of order simultaneously. A neural network and/or regression model may determine an estimated time of completion prediction accordingly such that a delivery routing system 128 may appropriately assign a courier at the optimal time.

Still referring to FIG. 5, at step 520, computing device 104 selects a runner route from a plurality of runner routes for delivering at least one alimentary combination of the plurality of alimentary combinations as a function of the plurality of assembly times where each runner route includes a information related to a runner, a runner route, and an aggregation depot. For example, a runner may be selected based on their proximity to an alimentary provider if an assembly time for an alimentary combination is short. As another example, a runner that is further away may be selected if the assembly time for an alimentary combination is longer. A runner route may be selected based parameters such as, but not limited to, traffic conditions, weather conditions, or the proximity of the location of the runner to the aggregation depot or the location of the consumer. For example, computing device 104 may assign a runner based on the traffic conditions. A runner that may be further from the alimentary provider may be selected over a runner that is closer, as the runner that is further away may experience lighter traffic conditions which will reduce travel time to the alimentary provider, whereas the one on close proximity to the alimentary provider may experience heavier traffic conditions which may increase travel time to the location of the alimentary provider.

Alternatively, or additionally, and still referring to FIG. 5, computing device 104 may select a runner route by training a machine-learning process using route planning training data correlating delivery times with a plurality of delivery parameters. Computing device 104 may receive at least a delivery parameter as an input and output a runner route based on a selection of aggregation depot and runner. Computing device 104 may compute runner route based on at least a delivery parameter using the machine-learning process. For example, once an aggregation depot and a runner are selected, computing device 104 will use a delivery parameter such as traffic, weather, and proximity to the alimentary provider and determine the best runner route that may be faster in getting the alimentary combination to the aggregation depot. Delivery parameters may include various factors or measurements that may affect the length of time between one or more tracked events, such as, for example, a runner may be delayed in getting to an alimentary provider. In various embodiments, delivery parameters may include time, date, traffic, weather, historical runner performance, and size of markets. Delivery parameters may further include a number of orders received, a number of items in an order, a type of dishes in an order, a sub-total of an order, and/or historical restaurant data; various other parameters may be used. Traffic information may be tracked in real-time. In some embodiments, traffic information may be tracked by a third-party application. In some embodiments, traffic data may be updated in real-time, or constantly updated in near real-time. Parameters corresponding to weather may also inform traffic or order impact. For example, inclement weather may correlate with heavier traffic due to hazardous conditions. Inclement weather may also correlate with more orders placed since users may be more likely to stay indoors. Weather parameters may also correspond to change in demands for particular food types. For example, more ice cream may be ordered during hot days. Another input parameter may include fleet load factor, which corresponds to the ratio of number of orders outstanding to the number of couriers outstanding. In some embodiments, the higher this ratio of fleet load factors may correspond to an insufficient number of couriers, and thus longer time durations for events after order ready. Historical performance of a courier may be a record of the previous time durations between one or more events on courier timeline for a particular runner. This record may be compared to the average time durations between one or more events on courier timeline for all couriers within a given area. Machine-learning processes and/or models may use this factor to assign a particular state variable to a given runner to adjust predictions accordingly. For example, a given runner may have shorter time durations between particular events, such as between parked at alimentary provider and arrival at alimentary provider, as compared to the average for a given area. In some embodiments, historical performance parameters may be organized into aggregate units for a predetermined amount of time. For example, the historical performance of a courier or alimentary provider for a previous thirty-day increment may be given higher weighted values. In some embodiments, historical performance parameters for days occurring before a previous thirty days may also be input with lower weighted values. In some embodiments, historical performance parameters for days occurring before a previous thirty (30) days may be discarded. In some embodiments, a machine-learning model and/or neural network may determine an average rate for time durations between one or more events on a courier timeline for couriers in a given predetermined area.

Alternatively, or additionally, machine-learning model may include any machine-learning model as described above, including without limitation a regression model and/or neural net. Training data used by computing device 104 and/or another device in system may include a plurality training entries, each training entry correlating extrinsic data such as, but not limited to current traffic conditions, current weather conditions, and/or proximity of the runner to the alimentary provider or the aggregation depot, and/or other data describing circumstances that may affect a runner and/or courier's performance to overall delivery times and/or intervals between events on a delivery and/or courier timeline as described above. There may be a plurality of predictive event models, which may include neural net models and/or regression models, for different courier timeline events, different couriers, or the like. Neural network may include a plurality of subnetworks, each of which function as a predictive event model to generate an estimated length of time for a particular interval of time between subsequent delivery events. As used herein, terms "subnetwork" and "event model" may be used interchangeably, unless otherwise noted. In some embodiments, each interval between events, such as those described above corresponding to a courier timeline, may be associated with a subnetwork. In other words, a predictive event model may predict a duration between one event to a subsequent event. For example, the machine learning process may use training data which correlates delivery times to current weather conditions and an algorithm as discussed above to train the system. Based on training data, the system may receive a data indicating that the weather shows snow, and based on that, a runner route will be computed. System may also utilize a plurality of variables to compute a route. For example, training data may contain data for a runner route that may be heavily congested when the weather shows snow. System may use this to provide a route where traffic conditions fair better when weather shows snow.

Still referring to FIG. 5, a runner may pick up an alimentary combination or a plurality of alimentary combinations based on assembly times from, at least an alimentary provider and transport them to an aggregation depot. A plurality of assembly times may be used to determine optimal retrieval times for a runner to arrive at the alimentary provider. Accurate predictions may prevent runner downtime while awaiting a meal that has not completed preparation, alimentary combination downtime that may occur when an alimentary combination is ready for pickup and no runner is present. Furthermore, accurate prediction of alimentary assembly times may enable greater accuracy in route prediction and/or assignment. Based on assembly times, a runner is then assigned to transport a plurality of alimentary combinations from the alimentary provider to the aggregation depot. For example, a runner may be in proximity to an alimentary provider, but the assembly time for the alimentary combination may not make the use of that runner efficient. That runner may be selected to go to a different alimentary provider that is also in proximity, but where assembly times of alimentary combinations may be shorter. In another embodiment, computing device 104 may select an aggregation depot as a function of order density at the aggregation depot. For example, one or more aggregation depots may be available to receive an order from a runner based on the volume of orders at a particular depot. One depot may have a high volume of orders; in that case, computing device 104 may select a depot that has a lower volume of orders even if that depot may be furthest away for a courier to deliver the alimentary combinations. A machine-learning model may be used and include any machine-learning model as described above, including without limitation a regression model and/or neural net. Training data used by computing device 104 and/or another device in system may include a plurality training entries, each training entry correlating extrinsic data such as volume order at a particular aggregation depot at particular times during the day and proximity of the aggregation depot to the runner. In another embodiment, an aggregation depot may be selected based on current traffic conditions and weather conditions. For example, an aggregation depot may be more impacted by traffic conditions as they may be located in a region with high traffic such as a major city. In this case, another depot may be selected that may be able to deliver food faster as that depot may not be impacted by such high traffic issues.

Still referring to FIG. 5, computing device 104 may select a runner as a function of current weather, current traffic, and proximity to an alimentary provider. For example, a runner may be proximate to the location of an alimentary provider, but the runner may be in an automobile during rush hour which increases the number of automobiles on the road. It may take that runner a longer amount of time to get to the alimentary provider or to the aggregation depot which makes the use of this runner less desirable. Another runner which may be further out but does not face a heavy amount of traffic may be a more efficient choice for a runner. A runner route may be assigned to a runner that may not be in proximity to the alimentary provider, but based on weather conditions, may take that runner a lesser amount of time to arrive at the location of the alimentary provider. For example, a runner route may be affected by inclement weather such as rain; a runner route selected for a runner that is not experiencing inclement weather may be more efficient even if the runner is not in proximity to the alimentary provider.

Referring to FIG. 5, at step 525, computing device 104 generates a plurality of predicted routes as a function of a proximity of the plurality of destinations to the aggregation depot. Each predicted route of the plurality of predicted routes includes a retrieval from the at least the aggregation depot; and at least a destination, of the plurality of destinations. As used in this disclosure, a "destination" is the final location of the alimentary combinations. For example, a destination could be a residential or business address, or a geo-location determined by coordinates provided by a global positioning system (GPS), or the like. A destination may be in proximity to one or more aggregation depots. A predicted route may be assigned to a plurality of couriers. The predicted route may be assigned based on the proximity of the aggregation depot to the destination. For example, once the alimentary combinations arrive at the aggregation depot, a predicted route may be assigned based on the destination of the alimentary combinations. A predicted route may include one or a plurality of destinations selected based on the location of the aggregation depot to the destination. As an example, a predicted route may include delivery of an alimentary combination to user 320*a* only; it may also include delivery to user 320*a* and user 320*b*; and it may also include delivery to user 320*a*, user 320*b*, and user 320*c*.

Still referring to FIG. 45, computing device 104 may generate a plurality of predicted routes including generating at least a compound route. A "compound route," as used in this disclosure, is a route to more than one destination and/or from more than one aggregation depot. For instance, a party of users may order a plurality of meals from different providers, which may be delivered together using a compound route. As an example, a plurality of orders to different destinations may be grouped together based on shared potential courier travel paths. For example, a single courier may pick up several alimentary combinations at an aggregate depot and deliver them to several users along a predicted route. In another example, courier may also pick up alimentary combinations at different aggregation depots and deliver them to users along a predicted route.

Still referring to FIG. 5, at step 530, computing device 104 pairs a predicted route of a plurality of predicted routes with a courier. "Pairing," as used in this disclosure, signifies assigning a predicted route to a courier. In an embodiment, computing device 104 may identify a plurality of currently active couriers. Couriers may indicate current activity to system 100; for instance, courier may enter a user command on a courier device indicating that courier is currently working. Computing device 104 may track positions, current activities, and likely times of arrival at different locations and/or timeline points of plurality of couriers using navigation facilities, beacons, and the like; courier status according to a courier timeline as described above may be used to determine courier availability for a route. For instance, as a courier travels to a destination, courier device may transmit to computing device 104 a status update indicating courier is traveling to a destination. In various embodiments, travel status may include a status of a vehicle corresponding to courier. For example, courier device may transmit a notification to computing device 104 that courier has parked his vehicle near the destination. Upon a courier's arrival at a destination, a confirmation of arrival at destination location may be received. In some embodiments, the confirmation of arrival at destination location may include a check-in status update input by the courier on the courier device. Once an order is provided to courier at an aggregation depot, a confirmation of order pickup may be received. In some embodiments, the confirmation of order pickup may be confirmed by the courier via the courier device.

As a further non-limiting example, and still referring to FIG. 5, a courier may travel to a user location after order pickup from an aggregation depot. As courier travels to user location, a travel status so indicating may be received by computing device 104. In various embodiments, travel status may include a status of a vehicle corresponding to courier. For example, courier device may transmit a notification to computing device 104 system that the courier has returned to the vehicle after the order pickup from an aggregation depot. As another example, a courier device may transmit a notification to computing device 104 that a courier has parked his or her vehicle near a user location. As another example, courier may then park his or her vehicle in an appropriate location to reach a user. In some embodiments, courier may confirm that vehicle is parked by transmitting a confirmation from courier device to computing device 104. Courier may then have to walk or otherwise travel from a parking location to user location. A confirmation of order delivery may be received from courier device. In some embodiments, a confirmation of order delivery may be confirmed by courier via courier device. Confirmation of order delivery may additionally or alternatively be confirmed by a user via a user device.

Alternatively or additionally, computing device 104 pairs a predicted route of a plurality of predicted routes with a courier by generating an objective function based on a plurality of objective and pairing, with the courier, the predicted route that optimizes the objective function. In various embodiments a score of a particular route and courier pairing may be based on a combination of one or more factors, including route efficiency, route priority, a projected lateness of a route, a reliability of the route, a fit of the route, and/or a state effect of the route. Each factor may be assigned a score based on predetermined variables. In some embodiments, the assigned scores may be weighted or unweighted.

Still referring to FIG. 5, route efficiency may correspond to how fast a courier may complete the delivery of an order along a generated route. This may be estimated based on historical courier performance data, as well as real-time traffic information and other geographic data items. In some embodiments, vehicle type may also be considered. For example, a motorcycle or scooter may be assigned a higher score than a car for particular routes because a motorcycle may be able to split lanes in heavy traffic. Route priority may correspond to how soon an order will be ready for pickup. In other words, the route priority may correspond to a time at which a given order is likely to be available for retrieval, based for instance on assembly time as described above, as well as on a time at which an order was initiated. In some embodiments, orders with earlier order ready events may be assigned higher scores. Projected lateness of a route may correspond to the difference in time between an estimated delivery time initially projected for a route and an estimated delivery time, such as delivery event, which may be predicted by a system based on updates received. In some embodiments, an estimated delivery time projected for a route may be determined based on real-time traffic information and other geographic data items; this may also be determined based on historical courier performance data. In some embodiments, if the projected route delivery time is later than a predicted and/or requested time for delivery, then the route may be assigned a lower score. By contrast, if a projected route delivery time is earlier than a requested and/or predicted time for delivery, then a route may be assigned a higher score. In some embodiments, an estimated delivery time projected by a route may be compared to a predetermined time threshold; if a projected delivery time is beyond the time threshold, the route may be given a zero score.

With continued reference to FIG. 5, a reliability of a route may correspond to a variance around an estimation for each point along the route. This may also correspond to a probability that a courier will complete an associated delivery by an estimated delivery time projected for a route. In some embodiments, historical route data may be used to determine the reliability of a route. For example, if a particular generated route includes one or more individual route segments, each route segment may include historical travel durations based on previously paired routes and tracked courier performances; previous travel durations for each segment may be compared and a standard deviation may be determined. A route with a more segments including larger standard deviations may correspond to a less reliable route and given a lower score. A fit of a route may correspond to how well the route fits a courier, which may be based on vehicle type, vehicle capacity, historical courier performance, or the like. A state effect of a route may correspond to an effect of the route on a balance of supply and demand with regard to available couriers and created orders in system 100. For example, a route that would bring a courier into an area where more couriers are needed may be scored higher.

Still referring to FIG. 5, generation of objective function may include generation of a function to score and weight factors to achieve a route score for each feasible pairing. In some embodiments, pairings may be scored in a matrix for optimization, where columns represent routes and rows represent couriers potentially paired therewith; each cell of such a matrix may represent a score of a pairing of the corresponding route to the corresponding courier.

With continued reference to FIG. 5, assigning predicted route that optimizes the objective function further comprises performing a greedy algorithm process. A "greedy algorithm" is defined as an algorithm that selects locally optimal choices, which may or may not generate a globally optimal solution. For instance, computing device 104 may select pairings so that scores associated therewith are the best score for each order and/or for each courier. In such an example, optimization may determine the combination of routes such that each delivery pairing includes the highest score possible.

Still referring to FIG. 5, objective function may be formulated as a linear objective function which computing device 104 may solve using a linear program such as without limitation a mixed-integer program. A "linear program," as used in this disclosure, is a program that optimizes a linear objective function, given at least a constraint. For instance, and without limitation, objective function may seek to maximize a total score Y. $\Sigma_{r \in R} \Sigma_{s \in S} c_{rs} x_{rs}$, where R is the set of all routes r, S is a set of all couriers s, $c_{rs}$ is a score of a pairing of a given route with a given courier, and $x_{rs}$ is 1 if a route r is paired with courier s, and 0 otherwise. Continuing the example, constraints may specify that each route is assigned to only one courier, and each courier is assigned only one route; routes may include compound routes as described above. Sets of routes may be optimized for a maximum score combination of all generated routes. In various embodiments, system 100 may determine combination of routes that maximizes a total score subject to a constraint that all deliveries are paired to exactly one courier. Not all couriers may receive a route pairing because each delivery may only be delivered by one courier. A mathematical solver may be implemented to solve for the set of feasible pairings that maximizes the sum of scores across all pairings; mathematical solver may implemented on computing device 104 and/or another device in system 100, and/or may be implemented on third-party solver.

With continued reference to FIG. 5, optimizing objective function may include minimizing a loss function, where a "loss function" is an expression an output of which an optimization algorithm minimizes to generate an optimal result. A machine-learning model may be used to optimize an objective function. For example, algorithms such as, but not limited to, stochastic gradient descent, stochastic gradient descent with momentum, AdaGrad optimization, RMSProp, Adam, or the like may be utilized to generate an optimal result such as an optimized predicted route. As a non-limiting example, computing device 104 may assign variables relating to a set of parameters, which may correspond to score components as described above, calculate an output of mathematical expression using the variables, and select a pairing that produces an output having the lowest size, according to a given definition of "size," of the set of outputs representing each of plurality of candidate ingredient combinations; size may, for instance, included absolute value, numerical size, or the like. Selection of different loss functions may result in identification of different potential pairings as generating minimal outputs. Objectives represented in an objective function and/or loss function may include minimization of delivery times. For example, optimization may include minimizing delivery times by choosing an aggregation depot that is in proximity to the user. Objectives may include minimization of wait times by runners at alimentary providers; objectives may include minimization of wait times by runners at alimentary providers. Wait times may depend, for instance and without limitation, on assembly times as described above. Objectives may include minimization of times delivery times in excess of estimated or requested arrival times. Objectives may include minimizing travel time as a function of current traffic conditions or current weather conditions.

Still referring to FIG. 5, computing device 104 may pair the predicted route from a plurality of predicted routes with a courier by selecting the predicted route as a function of selection of aggregation depot and runner route. Selection of a predicted route may be further improved by selection of an aggregation depot and/or runner. Selection of aggregation depot and/or runner may be performed additional parameters that may be contained in training data used in a machine-learning model to select an optimized route, and/or as parameters of an objective function for optimization as described in this disclosure. As a non-limiting example, algorithms such as, but not limited to, stochastic gradient descent, stochastic gradient descent with momentum, AdaGrad optimization, RMSProp, Adam, or the like may output an optimized route that may include a runner route, an aggregation depot, a courier, and predicted route for the courier. For example, a runner in a bicycle may be selected and used as an input to select a predicted route that may be close in proximity to the aggregation depot, even if the predicted route has high traffic. This may then predict a route for a courier that may be closer to the aggregation depot to minimize the amount of time the alimentary combination stays at the aggregation depot as the runner can get there faster since a bike is being used. Even if an optimized route for runner and predicted route for courier from a selected is selected based on optimization, it may be eliminated by computing device 104. For example, a selection of a depot based on close proximity to the destination of the alimentary combinations and low traffic may be eliminated if the depot has a high volume of orders to process based on a volume threshold as selection of the optimized route comprising the depot with high volume of orders may delay delivery of the alimentary combination to the user. As such, computing device 104 may select another depot which has a lower volume of orders even if it is further away from the destination. In another example, an optimized route may be eliminated if a selected runner during the optimization process encounters inclement weather (for example, a possible thunderstorm during the schedule pick-up by the runner entered as a constraint in the optimization process) within the runner route which may delay the pick up at the alimentary provider. In that case, the runner and/or the aggregation depot and/or the courier selected during the optimization process may be replaced to reduce the time for delivery of the alimentary combination to the user.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
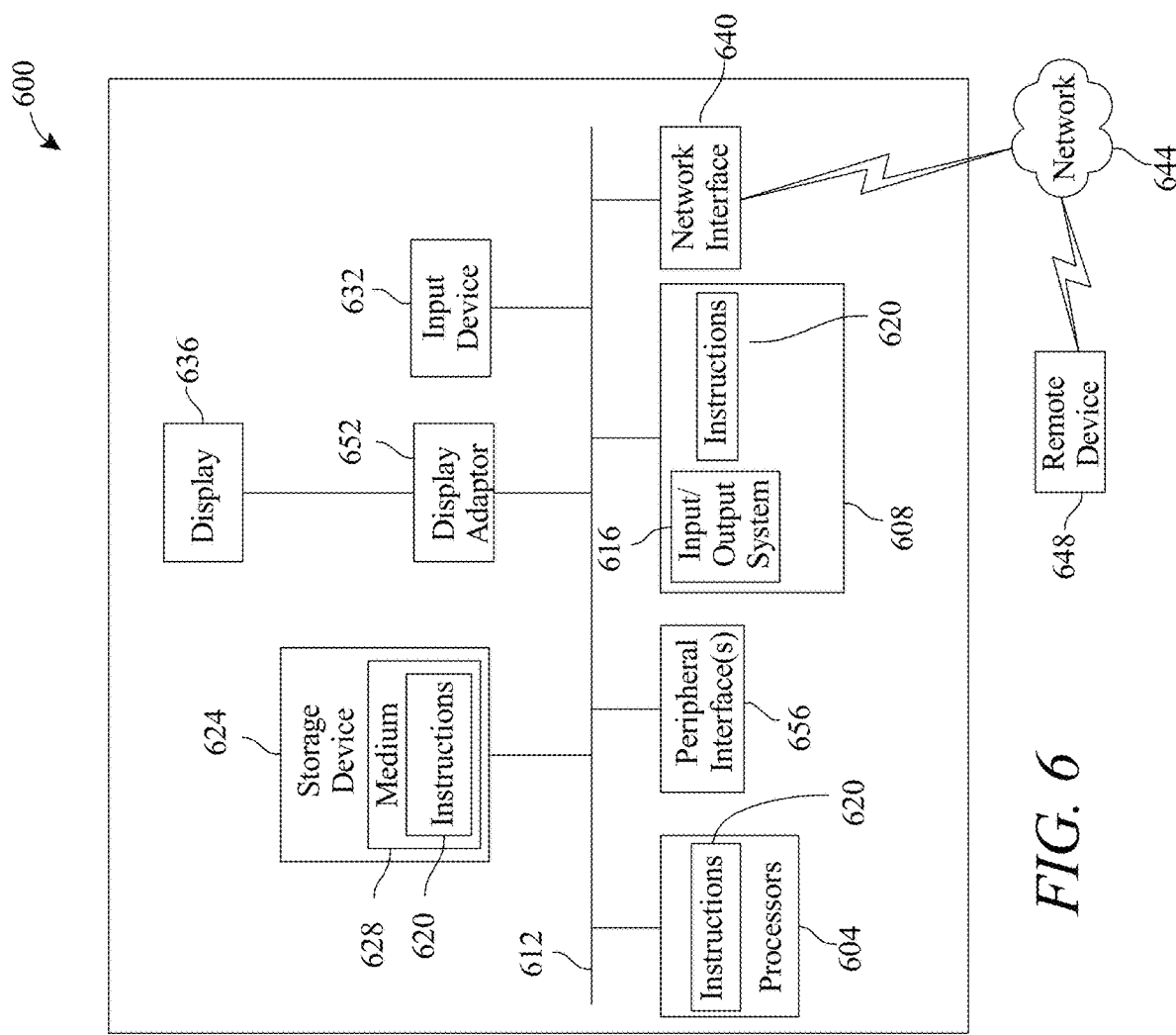
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC)

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display device 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 536. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of path selection using vehicle route guidance, the method comprising:
   receiving a plurality of requests including a plurality of alimentary combinations and a plurality of destinations, wherein each request specifies:
     an alimentary combination of the plurality of alimentary combinations to be assembled by an alimentary provider of a plurality of alimentary providers; and
     a destination of the plurality of destinations;
   computing a projected nutritionally guided order volume as a function of a first machine-learning process, guidance-free order volume, and an alimentary instruction set, wherein the machine-learning process is trained by data correlating past nutritionally guided order volumes with a plurality of past extrinsic circumstances, and wherein the machine-learning model receives at least a current extrinsic circumstance as inputs and outputs projected nutritionally guided order volume;
   determining a plurality of assembly times, the plurality of assembly times including an assembly time for each alimentary combination, as a function of the nutritionally guided order volume;
   selecting a runner route from a plurality of runner routes, for delivering at least one alimentary combination of the plurality of alimentary combinations, as a function of the plurality of assembly times, wherein each runner route of the plurality of runner routes further includes:
     information related to said runner, wherein the information includes health and religious information on the runner, wherein the health information includes allergy information on the runner;
     an aggregation depot; and
     a path from an alimentary provider of the plurality of alimentary providers to the aggregation depot;
   generating a plurality of predicted routes as a function of a proximity of the plurality of destinations to the aggregation depot, wherein each predicted route of the plurality of predicted routes comprises:
     a retrieval from the at least the aggregation depot; and
     at least a destination, of the plurality of destinations; and
   pairing a predicted route of a plurality of predicted routes with a courier, wherein pairing further comprises:
     generating an objective function based on a plurality of objectives, including minimizing travel time as a function of current weather conditions; and
     pairing, with the courier, the predicted route that optimizes the objective function, wherein optimizing the objective function comprises:
       minimizing a loss function; and
       eliminating optimized routes-based on delivery parameters including inclement weather.

2. The method of claim 1, wherein computing the projected nutritionally guided order volume further comprises:
   training the first machine-learning process using training data correlating past nutritionally guided order volumes with a plurality of past extrinsic circumstances;
   receiving at least a current extrinsic circumstances; and
   computing the projected nutritionally guided order volume as a function of the at least a current extrinsic circumstance using the machine-learning process.

3. The method of claim 1, wherein computing the projected nutritionally guided order volume further comprises computing a per-provider nutritionally guided order volume.

4. The method of claim 1 further comprising selecting a runner to arrive at the at least the alimentary provider upon completion of the assembly times by the at least the alimentary provider, wherein the runner delivers the alimentary combinations provided by the at least the alimentary provider to an aggregation depot.

5. The method of claim 1, wherein selecting a runner route further comprises:
   training a machine-learning process using training data correlating delivery times with a plurality of delivery parameters;
   receiving at least a delivery parameter; and
   computing the runner route as a function of the at least the delivery parameter using the machine-learning process.

6. The method of claim 1, wherein pairing the predicted route of a plurality of predicted routes with a courier further comprises:
   selecting the predicted route as a function of the selection of the aggregation depot and the runner.

7. The method of claim 6, further comprising selecting a runner route as a function of the selected predicted route.

8. The method of claim 1, wherein generating a plurality of predicted routes further comprises generating at least a compound route.

9. The method of claim 1, wherein pairing the predicted route of the plurality of predicted routes with the courier further comprises:
   identifying a plurality of currently active couriers; and
   assigning the predicted route to a courier of the plurality of active couriers.

10. A system for path selection using vehicle route guidance comprising a computing device, said computing device being configured to:
   receive a plurality of requests including a plurality of alimentary combinations and a plurality of destinations, wherein each request specifies:
     an alimentary combination of the plurality of alimentary combinations to be assembled by at least an alimentary provider; and
     a destination of the plurality of destinations;
   compute a projected nutritionally guided order volume as a function of a first machine-learning process, guidance-free order volume, and an alimentary instruction set, wherein, the machine-learning process is trained by data correlating past nutritionally guided order volumes with a plurality of past extrinsic circumstances, and wherein the machine-learning model receives at least a current extrinsic circumstances as inputs, and outputs projected nutritionally guided order volume;
   determine a plurality of assembly times, the plurality of assembly times including an assembly time for each alimentary combination, as a function of the nutritionally guided order volume;
   select a runner route from a plurality of runner routes, for delivering at least one alimentary combination of the plurality of alimentary combinations, as a function of the plurality of assembly times, wherein each runner route of the plurality of runner routes further includes:
     information related to a runner, wherein the information includes health and religious information on the runner, wherein the health information includes allergy information on the runner;
     an aggregation depot; and
     a path from an alimentary provider of the plurality of alimentary providers to the aggregation depot; and
   generate a plurality of predicted routes as a function of a proximity of a plurality of destinations to the aggregation depot, wherein each predicted route of the plurality of predicted routes comprises:
a retrieval from the at least the aggregation depot; and at least a destination, of the plurality of destinations;
pair a predicted route of the plurality of predicted routes with a courier, wherein pairing further comprises:
generating an objective function based on a plurality of objectives, including minimizing travel time as a function of current weather conditions; and
pairing, with the courier, the predicted route that optimizes the objective function, wherein optimizing the objective function comprises:
minimizing a loss function; and
eliminating optimized routes-based on delivery parameters including inclement weather.

11. The system of claim 10, wherein computing device is further configured to compute the projected nutritionally guided order volume by:
training the first machine-learning process using training data correlating past nutritionally guided order volumes with a plurality of past extrinsic circumstances;
receiving at least a current extrinsic circumstances; and
computing the projected nutritionally guided order volume as a function of the at least a current extrinsic circumstance using the machine-learning process.

12. The system of claim 10, wherein computing device is further configured to compute the projected nutritionally guided order volume by computing a per-provider nutritionally guided order volume.

13. The system of claim 10, wherein computing device is further configured to: select a runner to arrive at the at least the alimentary provider, wherein the runner delivers the alimentary combinations provided by the at least the alimentary provider to an aggregation depot.

14. The system of claim 10, wherein computing device is further configured to select a runner route by:
training a machine-learning process using route planning training data correlating delivery times with a plurality of delivery parameters;
receiving at least a delivery parameter as a function of a time of day, current traffic conditions, current weather, or a combination thereof; and
computing the runner route as a function of the at least the delivery parameter using the machine-learning process.

15. The system of claim 10, wherein computing device is further configured to pair the predicted route of a plurality of predicted route with a courier further comprises: selecting the predicted route as a function of the selection of the aggregation depot and the runner.

16. The system of claim 15, wherein computing device selects a runner route as a function of the selected predicted route.

17. The system of claim 10, wherein computing device is configured to generate a plurality of predicted routes by generating at least a compound route.

18. The system of claim 10, wherein computing device is further configured to pair the predicted route of the plurality of predicted routes with the courier by: identifying a plurality of currently active courier; and assigning the predicted route to a courier of the plurality of currently active couriers.

* * * * *